Figure 1:
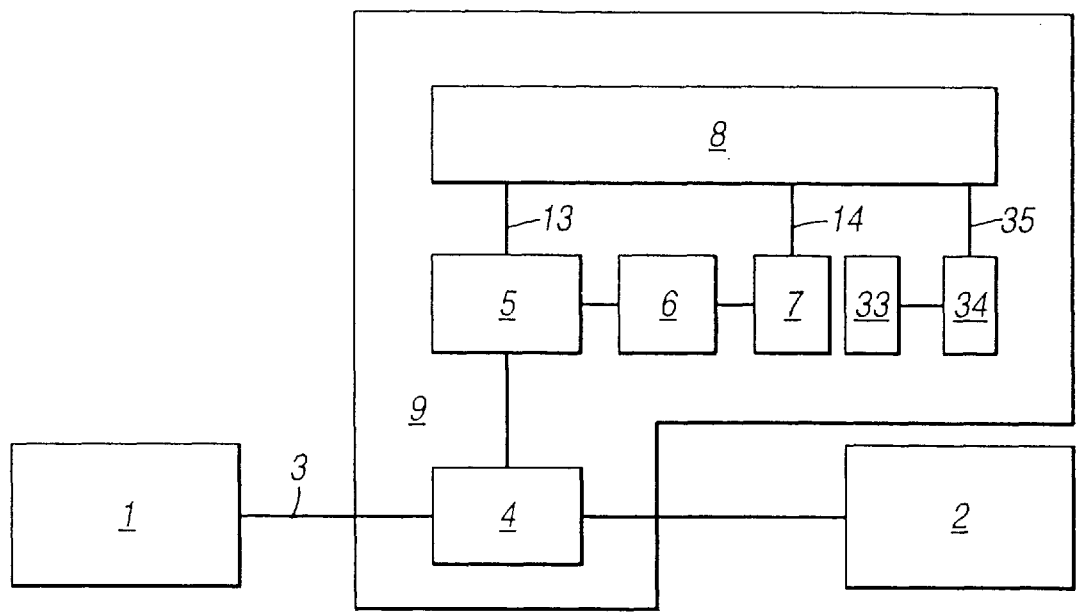

US005870399A

United States Patent [19]
Smith

[11] Patent Number: 5,870,399
[45] Date of Patent: Feb. 9, 1999

[54] TELECOMMUNICATIONS SYSTEM COMPRISING A COMMUNICATIONS PROTOCOL ANALYZER WHICH COMPRISES A NEURAL NETWORK THAT OBVIATES THE NEED FOR A DATABASE

[75] Inventor: Keith Smith, Hedge End, England

[73] Assignee: National Engineering & Assessment Group Ltd., United Kingdom

[21] Appl. No.: 662,650

[22] Filed: Jun. 13, 1996

[30] Foreign Application Priority Data

Jun. 16, 1995 [GB] United Kingdom .................... 9512303
Jul. 3, 1995 [GB] United Kingdom .................... 9513522

[51] Int. Cl.$^6$ ................................. H04J 3/16; H04J 3/22
[52] U.S. Cl. ............................ 370/465; 370/401; 395/21
[58] Field of Search .................................. 370/465, 466, 370/467, 400, 401, 244, 402; 375/222; 364/148.03; 701/59; 706/2, 15; 395/21–23, 285, 831

[56] References Cited

U.S. PATENT DOCUMENTS

| | | | |
|---|---|---|---|
| 4,775,973 | 10/1988 | Toberlin et al. ........................... | 370/60 |
| 5,040,171 | 8/1991 | Osaki ......................................... | 370/17 |
| 5,260,970 | 11/1993 | Henry et al. .............................. | 375/10 |
| 5,583,793 | 12/1996 | Gray et al. ............................... | 364/514 |
| 5,586,117 | 12/1996 | Edem et al. .............................. | 370/466 |
| 5,742,604 | 4/1998 | Edsall et al. ............................. | 370/401 |

FOREIGN PATENT DOCUMENTS

| | | |
|---|---|---|
| 0474932A1 | 3/1992 | European Pat. Off. . |
| 0478175A1 | 4/1992 | European Pat. Off. . |
| 0547776A2 | 6/1993 | European Pat. Off. . |
| 0644674A2 | 3/1995 | European Pat. Off. . |
| 94/00938 | 1/1994 | WIPO . |

*Primary Examiner*—Douglas W. Olms
*Assistant Examiner*—David R. Vincent
*Attorney, Agent, or Firm*—Evenson, McKeown, Edwards & Lenahan, P.L.L.C.

[57] ABSTRACT

Telecommunications systems embody means for establishing communications links between entities within that telecommunications system. These links are usually established following an exchange of digital messages in accordance with a communications protocol. Communications protocols are often sophisticated, involving a sequence of complex message exchanges. Known protocol analysers for testing communications protocols involve the use of data bases, which are pre-programmed with all possible combinations of messages sequences which correspond with the protocol to be tested. This is time consuming, expensive and inflexible. By using a neural network within the protocol analyser, a sequence of messages exchanged in accordance with a correctly operating communications protocol may be learned, obviating the need for a data base.

10 Claims, 3 Drawing Sheets

| CORRECT | ERRORED |
|---------|---------|
| 0000 | 0001 |
|  | 0010 |
|  | 0100 |
|  | 1000 |
| 1111 | 1110 |
|  | 1101 |
|  | 1011 |
|  | 0111 |

Fig. 5

TELECOMMUNICATIONS SYSTEM COMPRISING A COMMUNICATIONS PROTOCOL ANALYZER WHICH COMPRISES A NEURAL NETWORK THAT OBVIATES THE NEED FOR A DATABASE

The present invention relates to data analysers, and in particular it relates to data analysers, which operate to analyse a sequence of digital messages which are exchanged by two communicating entities in accordance with a pre-determined protocol. Such data analysers are known as protocol analysers.

The European Telecommunications Standards Institute (ETSI) is an example of a standardisation body. Such bodies serve to publish telecommunications standards, recommendations and regulations for the form, implementation and operation of various telecommunications systems. An example is the GSM (Global System for Mobiles) recommendations for a pan-European digital mobile radio system. Establishing and maintaining adherence to a standard or recommendation, permits the construction of a communications system from items of equipment provided by different manufacturers. To achieve this aim, newly developed items of communications equipment are subjected to conformance tests. These conformance tests, test, amongst other things, communications protocols which operate in accordance with the relevant standard. Once these regulatory conformance tests have been passed, the manufacturer is permitted to market the equipment as being compatible with the relevant standard.

Communications protocols operate to establish communications links between entities within a communications system on which data is to be conveyed. A communications protocol consists of a series of often complicated digital messages, which are exchanged during a transaction between corresponding entities within the communications system. An example of this is a message exchange between a telephone and an ISDN telecommunications exchange, which serves to set up a connection between the telephone and another telephone in a telecommunications network.

A digital protocol message is here defined as being a digital data word containing data appertaining to a command or a piece of information generated in accordance with a communications protocol.

To perform a conformance test on a communications protocol, an item of test equipment known as a protocol analyser is used.

There are two ways in which a protocol analyser may be used.

Traditionally, a protocol analyser is connected directly to an item of communications equipment to be tested via an appropriate interface. The protocol analyser is arranged to stimulate and exchange messages with the communications equipment under test, in accordance with the communications protocol of the standard concerned. In this case, the protocol analyser is emulating a communications system, to which the item of equipment under test is to be connected. This type of analysis is known as active analysis.

One of the major disadvantages with a protocol analyser adapted to perform active analysis is that it must incorporate a database containing all possible sequences of digital protocol messages required to emulate a communications protocol. Programming such a database requires a considerable amount of effort and expense, because communications protocols are often sophisticated. Furthermore, the database must itself be thoroughly tested before confidence in its operation can be gained. A yet further disadvantage is that the database must be re-programmed when any alteration is made in the communications protocol, in accordance with, for example, an enhancement in a telecommunications systems. This re-programming would involve even more expense. The use of databases for testing communications protocols is therefore generally rather inflexible.

An alternative way of performing a conformance test on an item of communications equipment is to connect the equipment to be tested into an existing communications system which conforms to the same standard. This presents a "go/no go" test in that if the equipment conforms to the standard then it will work, but if it does not so conform, then it will not work. The disadvantage with this simplistic test is that if the equipment does not work, no information will be gained as to why the communications protocol broke down. However, this problem can be overcome by adapting and arranging a protocol analyser to be connected into the interface between the equipment under test and the communications system. This arrangement permits the protocol analyser to monitor the protocol messages, which are exchanged between the communications equipment under test and the corresponding entities within the system. This arrangement removes the requirement for a protocol analyser to directly stimulate and respond to the communications equipment under test, because the stimulating messages are provided by the existing communications system. This arrangement for protocol analysis is known as passive protocol analysis.

Protocol analysers known in the state of the art which can be arranged to perform passive protocol analysis as hereinbefore described, still suffer the disadvantage that they require a database to be pre-programmed with all possible sequences of protocol messages, in order to be able to recognise a correct or incorrect message sequence.

Neural computing is a known technique for recognising sets of digital data words. A neural network is capable of differentiating between digital data words belonging to a desired set, and digital data words not belonging to that set. This is achieved by training a neural network with a set of data words which are known to be correct, and with a set of digital data words which are known to be incorrect. The set of incorrect data words is known as a negative training set. Reference is hereby drawn to the book entitled 'Neural Computing an Introduction' by R Beale and T Jackson, where further explanation on neural networks can be gained.

As will be appreciated by those skilled in the art, the number and order of protocol messages corresponding to a correctly operating communications protocol is typically small compared to the number not in the desired set. Therefore providing all incorrect protocol messages is an arduous and time consuming task. Consider the example where the protocol messages are binary and have N bits. In this case there are $2^N$ possible protocol messages. If the number of correct protocol messages is W, which is typically much less than $2^N$, then the number of possible errored protocol messages will be large. The number of errored protocol messages is $2^N$-W, which is all possible combinations of bits not in the correct protocol message set. If W is for example twenty, and N is ten, then there will be one thousand and four words in the errored set.

It is an object of the present invention to provide a protocol analyser for performing passive analysis of a communications protocol, which does not require the use of a pre-programmed database.

According to an aspect of the present invention there is provided a protocol analyser for analysing a communications protocol, comprising a monitor means for monitoring digital protocol messages which are exchanged in accordance with the communications protocol, and a neural network means being connected to the monitor means and arranged to operate in dependence upon first and second data, the first data appertaining to a set of monitored digital protocol messages and the second data appertaining to a set of errored digital protocol messages, which neural network means operates in either a training mode in which the neural network learns from the first and the second data to recognise the set of monitored digital protocol messages, or an analysis mode in which the neural network means analyses the first data appertaining to the monitored set of digital protocol messages, thereby providing the protocol analyser with means for learning a set of digital protocol messages corresponding to a communications protocol operating correctly, and for detecting whether a subsequently monitored communications protocol, corresponding to that learned communications protocol, is operating incorrectly.

The protocol analyser may further comprise a first data store being connected to the monitor means and the neural network means for storing the first data appertaining to the digital protocol messages monitored by the monitor means, a data processor being connected to the first data store for generating, in accordance with the data contained in the first data store, the second data appertaining to a corresponding set of errored digital protocol messages, and a second data store being connected to the data processor and to the neural network means for storing the data generated by the data processor.

The protocol analyser may be used to perform passive protocol analysis of a communications protocol, wherein the monitor means is adapted and arranged to be connected into an interface between two communicating entities, across which interface digital protocol messages are exchanged in accordance with the communications protocol.

As may be appreciated by those skilled in the art, by providing means for generating a set of incorrect protocol messages, the neural network within the protocol analyser may be trained to differentiate between a protocol operating correctly and one operating incorrectly. The protocol analyser is therefore provided with means for learning the correct protocol, obviating the need for a database.

The data processor may generate the second data appertaining to a set of errored protocol messages which said errored set comprises all single digit error protocol messages for each correct protocol message.

In the case where the digital protocol command words are binary, the negative training set is formed by generating, for each correct protocol message, all possible single bit error protocol messages. That is to say, every correct protocol message has a corresponding sub-set of protocol messages each member of that subset having 1 bit different to the correct protocol message. The number of sub-sets is equal to the number of correct protocol messages. No two protocol messages in the errored set are the same.

The neural network means within the protocol analyser may comprise a neural network being connected to the first data store and consisting of at least two neurons, each neuron having one or more inputs, each input having a multiplicative weighting factor associated therewith, the neurons being connected to form a network, with one or more neurons forming an output signal, and a training means being connected to the first data store and the second data store and being operatively connected to each weighting factor and the output signal from the neural network, for operating, when in the training mode, to adjust the weighting factors, in dependence upon the first and second data and an output signal from the neural network, and which training means is inhibited when in the analysis mode, thereby providing means for training the neural network in the training mode and for subsequently analysing protocol messages of a communications protocol when in analysis mode.

The neural network which forms a part of the neural network means, may be a back propagation neural network, comprising several neurons arranged in at least two layers, the number of neurons in a first layer being proportional to the number of digits in the said digital protocol messages, the neurons in one layer being connected to the neurons in a subsequent layer, and an output neuron being connected to the final layer of neurons for forming the output signal.

The neurons within the neural network may comprise a summing means being connected to each input of the neuron for summing the weighted signals received therefrom, and a threshold means being connected to the output of the summing means for generating an output signal in correspondence with the level of the output from the summing means.

The weighting factors on the inputs to each neuron are adjusted by the training means according to a training algorithm as a function of the correct and errored sets of protocol messages and the output signal from the neural network. After the neural network has been trained, it will be able to recognise a set of digital protocol messages corresponding to a correct communications protocol and reject protocol messages which correspond to an incorrect protocol. An appropriate output signal is generated by the neural network in accordance with correct or incorrect protocols.

The protocol analyser may include a third data store for storing a set of weighting factors from the neural network, which weighting factors correspond to a particular protocol for which the neural network has been trained.

The protocol analyser may furthermore include a weighting factor selector being connected to the third data store and the neural network means for selectively retrieving, from the third data store, the said weighting factors learned for a particular protocol and substituting the weighting factors of the neural network in accordance with a protocol to be analysed.

According to another aspect of the present invention there is provided a method for training a neural network to recognise a communications protocol, which method is comprised of deriving a set of correct protocol messages in accordance with a communications protocol operating correctly, generating a set of errored protocol messages, which errored set is comprised of all single digit error protocol messages corresponding to each protocol message in the set of correct protocol messages, and training the neural network with a training algorithm using the correct set of protocol messages as a desired training set, and the errored set of protocol messages as a negative training set.

A negative training set, sufficient to train the neural network, can be derived from the correct set of protocol messages monitored for a communications protocol operating correctly. This is achieved by generating, for each correct protocol message, all corresponding protocol messages with a single digit in error. If W is the number of messages in the correct set, the closest set to the correct set will be those protocol messages having only a single error, that is to say, those protocol messages having a minimum hamming distance from the correct set. The neural network can be trained with a negative training set which is comprised of those errored protocol messages containing a single error, which have a minimum hamming distance. Therefore any errored protocol messages with a larger number of errors will have a larger hamming distance and so will also be rejected by the neural network. This obviates the need for training the neural network with all possible errored protocol messages. If N is the number of bits in the protocol messages, the maximum number of messages in the errored protocol message set will be W×N. If W is twenty and N is ten the total number of words in the errored message set is two hundred.

Figure 2:
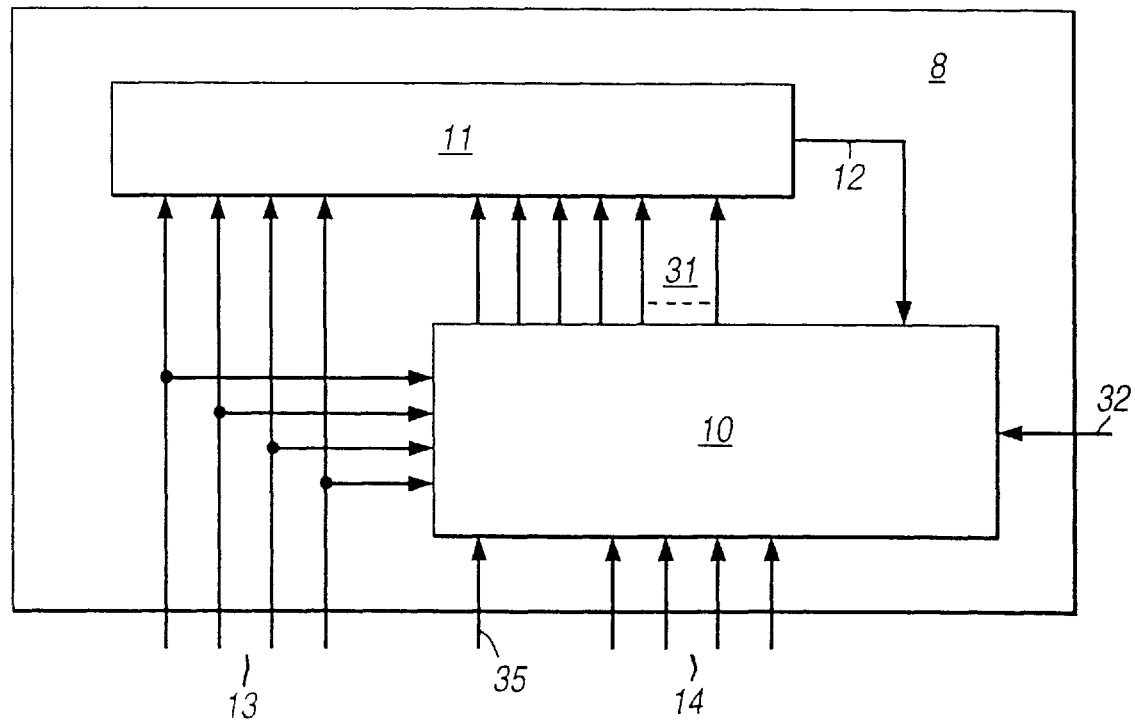
Figure 3:
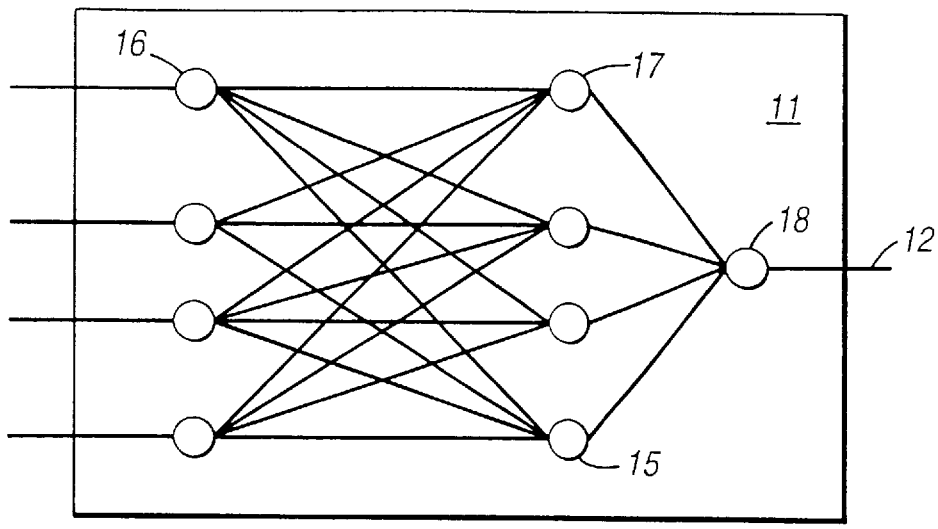
Figure 4:
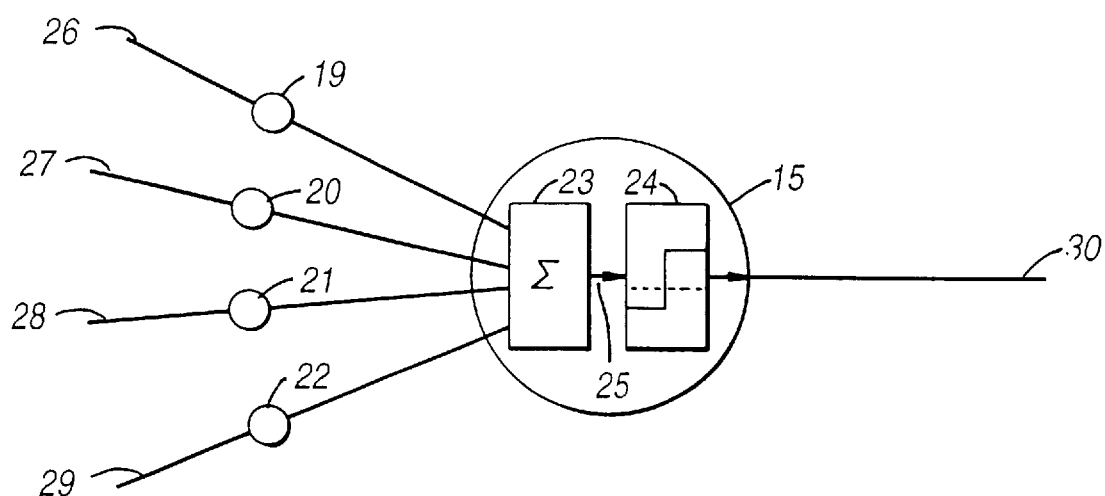

An embodiment of the present invention will now be described by way of example only, with reference to the accompanying drawings, in which;

FIG. 1 is a schematic block diagram illustrating the protocol analyser configured to perform passive analysis of a communications protocol, FIG. 2 is a schematic block diagram illustrating the neural network means of the protocol analyser, wherein those parts of the neural network means shown in FIG. 1 bear the same numerical designations, FIG. 3 is a schematic block diagram of a neural network, wherein those parts of the neural network shown in FIG. 2 bear the same numerical designations, FIG. 4 is a schematic block diagram illustrating the structure of a neuron, wherein those parts of the neuron shown in FIG. 3 bear the same numerical designations, and FIG. 5 shows a table of correct and errored set of protocol words.

An illustration of the protocol analyser performing passive protocol analysis is given in FIG. 1. Here a unit to be tested 1, is connected to an existing communications system 2, via a suitable interface, 3. Into the interface 3, is connected a monitor means 4, which serves to monitor digital protocol messages exchanged according to a communications protocol to be tested. The monitor means 4, generates data representing the monitored digital protocol messages which are stored in a first memory unit 5. A data processor 6, then operates to generate a set of errored protocol messages in correspondence with the digital protocol messages held in the first memory unit 5. In this example the protocol messages are binary data words. The set of errored protocol messages consists of all possible single bit error protocol messages for each protocol message held in the first memory unit 5. The set of errored protocol messages is stored in a second memory unit 7. A neural network 8, is connected to the first and second memory units 5,7.

When in training mode, the neural network 8, is trained in accordance with the data in the first and second memory units 5, 7, to recognise the protocol messages monitored by the monitor means 4. By allowing the protocol analyser 9, to learn a communications protocol known to be operating correctly whilst the neural network is in training mode, the protocol analyser 9, can subsequently analyse a communications protocol when the neural network 8, is in analysis mode. Hence an already functioning item of communications equipment which is equivalent to the item to be tested is used to train the neural network 8, within the protocol analyser 9. This item of equipment is replaced by the item of equipment to be tested and analysed by the protocol analyser 9, with the neural network 8, in analysis mode.

The neural network means 8, is shown in FIG. 2 to embody a training means 10, and a neural network 11. The training means 10, operates to train the neural network 11, in dependance upon the set of correct protocol messages stored in the first memory unit 5 the set of errored protocol messages stored in the second memory unit 7, and an output from a neural network 12. A set of protocol messages is fed to the training means 10, and the neural network 11, from the first memory unit 5, via a parallel databus 13. The set of errored protocol messages is fed to the training means 10, from the second memory unit 7, via a second parallel databus 14.

An example of how the neural network might be connected is shown in FIG. 3. The neural network is made up of a number of neurons. An example of a neuron 15, is shown in FIG. 3 and in FIG. 4 in more detail. In FIG. 3 an input layer of neurons 16, are connected to a second or hidden layer of neurons 17, which are subsequently connected to an output neuron 18 for forming an output signal fed from a conductor 12.

As an illustration of the operation of the protocol analyser 9, a communications protocol will be considered which comprises a sequence of message exchanges which may be formed into data words of four bits. For this reason the first and second parallel databuses 13, 14 are shown with four conductors each conductor delivering a bit of the four bit word to the neural network 11. Furthermore the input layer of neurons 16 consists of four neurons, each neuron being correspondingly connected to a conductor of the first databus 13.

On each input of every neuron in the neural network 11, is a multiplicative weighting factor. These are not shown in FIG. 3. However in FIG. 4 the neuron 15 is shown with four inputs and four corresponding weighting factors 19, 20, 21, 22.

The neuron 15, is further comprised of a summing means 23, and a threshold means 24. Consider that four signals $x_1$ $x_2$ $x_3$ and $x_4$ are applied respectively to the four inputs of the neuron 26, 27, 28,29. Consider also that the factors $w_1$, $w_2$, $w_3$ and $w_4$ are applied respectively to the multiplicative weighting factors 19, 20, 21, 22. Then the output signal 25 generated by the summing means 23 is according to equation 1.

$$Sout = \sum_{i=1}^{4} WiXi \quad (1)$$

The output signal from the summing means 23, is then applied to the threshold means 24, which produces a binary output 1 or 0 in accordance with the level of the output 25, from the summing means 23, as compared with a threshold θ according to equations 2.

1 if Sout > θ

0 if Sout ≦ θtm (2)

The output signal 30, from the neural network 15 is therefore a single binary digit which is a function of the inputs $x_i$, and the weighting factors $w_i$ where i=1 to 4.

When in training mode the training means 10, adjusts the weighting factors so that the output 12, from the neural network is binary 1 for a correct protocol message, and a binary 0 for an incorrect protocol message.

Consider as an illustration that there are two four bit protocol messages which correspond to the set of correct protocol messages supplied by the monitor 4. Let us suppose that there are two correct protocol messages and these are 0000 and 1111. The monitor means 4, feeds these two binary words to the first memory unit 5, where they are stored. The data processor 6, then operates to generate the set errored protocol messages which consists of all possible single bit error words for each word in the set of correct protocol messages. These are shown in the table in FIG. 5.

Referring to FIG. 5, there are eight words in the set of errored protocol words. This is the maximum number possible because no member of the first subset of errored words appears in the second subset. Had this been the case then the total errored set would have been reduced because the same errored protocol word need appear only once. The training means 10, adjusts each weighting factor in the neural network 11, to which the training means is connected via a set of conductors 31. Each conductor in the set of conductors 31, represents a connection to a corresponding weighting factor.

A training means 10, adjusts the weighting factor $w_i$ in accordance with a learning algorithm. An example of a learning algorithm, which could be used to train the neural network in this application, is the Widrow-Hoff delta rule. This is described as follows.

After initialising the weighting factor $w_i$ to some arbitrary value for each step in the algorithm represented a time t, present one of the data words from either the set of correct or error protocol words to the input of the neural network. At each step in time t form an error value $\Delta$ by comparing the desired response d(t) with the actual response of the output y(t), when either a correct or errored protocol message is present at the input layer of neurons. The tap weights $w_i$ are adjusted as according to equation (3).

$$\Delta = d(t) - y(t) \quad (3)$$

$$w_i(t+1) = w_i(t) + \eta \Delta X_i(t)$$

$$d(t) = \{+1, \text{if input is from correct set}$$
$$\{0, \text{if input is from incorrect set}$$

$\eta$ is a gain term $0 < \eta \geq 1$.

After a number of iterations of the algorithm the neural network 11, will have been trained by the training means 10, to recognise the set of correct and errored protocol words producing respectively a binary one or zero at the output of the network 12. The protocol analyser is then in a state where it can analyse a communications protocol corresponding to that which it has learned. Furthermore the protocol has been learned without the need to generate all possible errored protocol messages. In this example where there are two correct four bit words, the number of possible errored protocol messages is fourteen, whereas only eight errored words were needed to train the neural network 11. This is because the errored set of protocol words was chosen to include those eight words which were closest in hamming distance to the correct set. Those errored protocol words not used in the training set will be naturally detected by the neural network when in analysis mode by virtue of the fact that they will have a greater hamming distance than those that were used to train the network.

The protocol analyser may subsequently be used to analyse a communications protocol which corresponds to the protocol messages learnt. To do this the item of communications equipment know to be working correctly is replaced by one to be tested. The training means is then switched from training to analysis mode by an appropriate signal applied to an external input 32. In analysis mode the training means is inhibited from further changing the tap weights of the neural network 12 allowing the neural network to analyse the data words presented at its input.

The weighting factors of the neural network which have been trained in accordance with the learning algorithm, embody the information whereby the neural network 11, may recognise this protocol. Once a particular communications protocol has been learned by the protocol analyser, the weighting factors may be stored and recalled, whenever this particular communications protocol is to be analysed. In this way the protocol analyser can be used for a plurality of communications protocols, by selectively recalling the appropriate weighting factors. To achieve this, a third memory unit 33, is used to store the weighting factors. A selector unit 34, stores and retrieves the weighting factors in accordance with the communications protocol to be analysed, determined externally (not shown). The weighting factors are fed to and from the neural network via a data bus 35, which is not shown in detail.

Although the protocol analyser has been described for testing a communications protocol, it will be appreciated that it could equally be applied to other applications requiring the testing of a sequence of digital data words. For example the protocol analyser could be used to verify a correct sequence of instructions issued by a microprocessor, or other computing or logic devices.

I claim:

1. A protocol analyser for analysing a communications protocol, comprising a monitor means for monitoring digital protocol messages which are exchanged in accordance with the communications protocol, and a neural network means being connected to the monitor means and arranged to operate in dependence upon first and second data, the first data appertaining to a set of monitored digital protocol messages and the second data appertaining to a set of errored digital protocol messages, which neural network means operates in either a training mode in which the neural network learns from the first and the second data to recognise the set of monitored digital protocol messages, or an analysis mode in which the neural network means analyses the first data appertaining to the monitored set of digital protocol messages, thereby providing the protocol analyser with means for learning a set of digital protocol messages corresponding to a communications protocol operating correctly, and for detecting whether a subsequently monitored communications protocol, corresponding to that learned communications protocol, is operating incorrectly.

2. A protocol analyser as claimed in claim 1, comprising a first data store being connected to the monitor means and the neural network means for storing the first data appertaining to the digital protocol messages monitored by the monitor means, a data processor being connected to the first data store for generating, in accordance with the data contained in the first data store, the second data appertaining to a corresponding set of errored digital protocol messages, and a second data store being connected to the data processor and to the neural network means for storing the data generated by the data processor.

3. A protocol analyser as claimed in claim 1 used to perform passive protocol analysis of a communications protocol, wherein the monitor means is adapted and arranged to be connected into an interface between two communicating entities, across which interface digital protocol messages are exchanged in accordance with the communications protocol.

4. A protocol analyser as claimed in claim 2, wherein the data processor may generate the second data appertaining to a set of errored protocol messages which said errored set comprises all single digit error protocol messages for each correct protocol message.

5. A protocol analyser as claimed in claim 4, wherein the neural network means comprises a neural network being connected to the first data store and consisting of at least two neurons, each neuron having one or more inputs, each input having a multiplicative weighting factor associated therewith, the neurons being connected to form a network, with one or more neurons forming an output signal, and a training means being connected to the first data store and the second data store and being operatively connected to each weighting factor and the output signal from the neural network, for operating, when in the training mode, to adjust the weighting factors, in dependence upon the data stored in the first and second data stores and an output signal from the neural network, and which training means is inhibited when in the analysis mode, thereby providing means for training the neural network in the training mode and for subsequently analysing protocol messages of a communications protocol when in analysis mode.

6. A protocol analyser as claimed in claim 5, wherein the neural network which forms a part of the neural network means, may be a back propagation neural network, comprising several neurons arranged in at least two layers, the number of neurons in a first layer being proportional to the number of digits in the said digital protocol messages, the neurons in one layer being connected to the neurons in a subsequent layer, and an output neuron being connected to the final layer of neurons for forming the output signal.

7. A protocol analyser as claimed in claim 6, wherein the neurons within the neural network are comprised of a summing means being connected to each input of the neuron for summing the weighted signals received therefrom, and a threshold means being connected to the output of the summing means for generating an output signal in correspondence with the level of the output from the summing means.

8. A protocol analyser as claimed in claim 1, wherein the protocol analyser includes a third data store for storing a set of weighting factors from the neural network, which weighting factors correspond to a particular protocol for which the neural network has been trained, thereby providing a facility for the protocol analyser to be selectively used to learn a number of different protocols.

9. A protocol analyser as claimed in claim 8, wherein the protocol analyser includes a weighting factor selector being connected to the third data store and the neural network means for selectively retrieving, from the third data store, the said weighting factors learned for a particular protocol and substituting the weighting factors of the neural network in accordance with the protocol to be analysed.

10. A method for training a neural network to recognise a communications protocol, which method is comprised of deriving a set of correct protocol messages in accordance with the communications protocol operating correctly, generating a set of errored protocol messages, which errored set is comprised of all single digit error protocol messages corresponding to each protocol message in the set of correct protocol messages, and training the neural network with a training algorithm using the correct set of protocol messages as a desired training set, and the errored set of protocol messages as a negative training set.

* * * * *